United States Patent [19]

Schreiber

[11] 4,016,077
[45] Apr. 5, 1977

[54] BLOOD TRANSFUSION FILTERS

[76] Inventor: Gus Schreiber, 5619 W. Caruth, Dallas, Tex. 75209

[22] Filed: Aug. 25, 1975

[21] Appl. No.: 607,474

[52] U.S. Cl. .................. 210/77; 128/214 R; 210/241; 210/350; 210/359; 210/385; 210/519; 210/523; 210/DIG. 23

[51] Int. Cl.² .................................... B01D 33/22

[58] Field of Search .......... 210/DIG. 23, 359, 385, 210/364, 365, 366, 367, 384, 338, 456, 77, 241, 350, 513, 519, 523; 23/259; 128/214 R, 272; 233/5, 2

[56] References Cited

UNITED STATES PATENTS

| | | | |
|---|---|---|---|
| 1,141,972 | 6/1915 | Muhleman | 210/456 |
| 2,727,441 | 12/1955 | Cram | 210/456 |
| 2,899,070 | 8/1959 | Murphy | 210/359 |
| 3,885,735 | 5/1975 | Westbert | 210/DIG. 23 |
| 3,891,416 | 6/1975 | Leonard et al. | 210/DIG. 23 |
| 3,900,398 | 8/1975 | Gillette | 210/456 |

*Primary Examiner*—Frank W. Lutter
*Assistant Examiner*—Frank Sever
*Attorney, Agent, or Firm*—Richards, Harris & Medlock

[57] ABSTRACT

My invention permits very small pore filtration of blood by means of a high capacity "two-dimensional" filter of round pores of twelve to fifteen microns in diameter. The viscous blood and its cells and platelets are forced through these minute orifices by means of a pressure applied to the flexible bag of donor blood, a rigid connecting passageway, and to a flexible pleated solid sheath which covers the filter but which is sealed to the outer portion of the connecting passageway and to the periphery of the filter. These flexible portions are first emptied of air by means of a vacuum applied from below the filter and then the blood is evenly maintained above this large filter by means of producing a slowly rotating swirling wave of blood. The blood is collected by gravity funnel drainage into a receiving bottle. Any frothed blood which enters this receiving bottle is removed from its top by vacuum aspiration.

6 Claims, 1 Drawing Figure

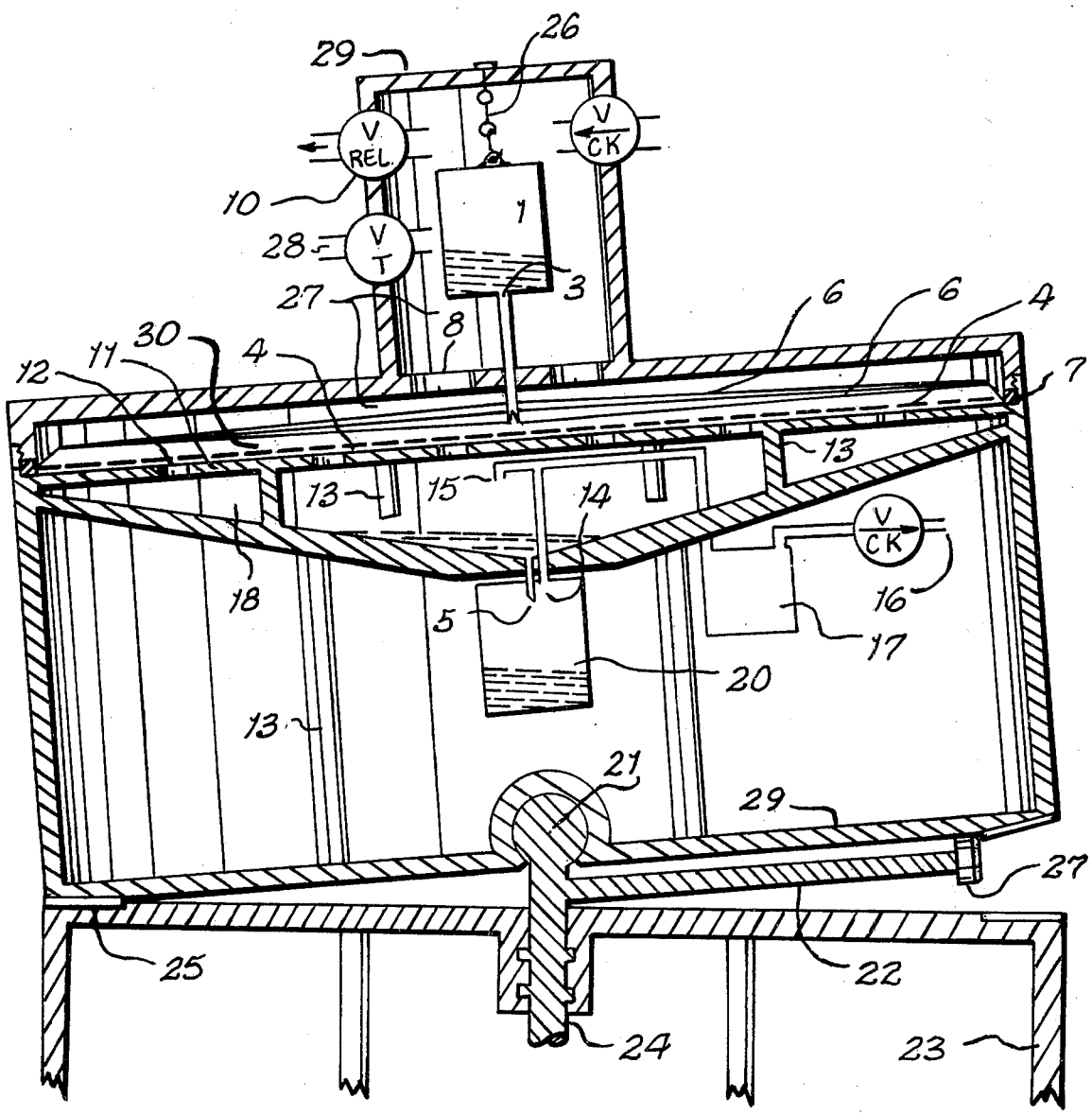

BLOOD TRANSFUSION FILTERS

I have reported the presence in blood of vast numbers of endothelial cells and of many clotted small vessels ensheathed in their basement membranes and containing within their clot exogenous plant crystals and ashed films. I have also reported the presence in blood of such vessels within vessels indicating a perpetual viscious circle of emboli between the pulmonary and the peripheral vascular beds. Others have shown blood vessel basement membranes within pulmonary vessels and have also shown that the incidence of "Acute Respiratory Distress Syndrome" following massive volume transfusion is reduced significantly by using in line 40 micron pore filters when the blood is administered to the recipient.

My invention permits very small pore filtration of blood by means of a high capacity "two-dimensional" filter of round pores of twelve to fifteen microns in diameter. The viscous blood with its contained cells and platelets are forced through these minute orifices in a larger filter by means of pressure applied to the flexible bag of donor blood with its rigid connecting passageway to another flexible pleated solid sheath of blood which is sealed to the passageway exterior wall and to the sealed periphery of the filter. The flexible portions of this system are first emptied of air by the application of a vacuum through and beneath the filter. The blood under pressure beneath this flexible pleated solid sheath above the filter is evenly spread about over this large filter by means of producing a slowly rotating swirling wave of blood. The blood is collected from beneath the filter by gravity funnel drainage into a receiving bottle. This pressure filtration blood rotary system could easily be applied to "on-line" application for prolonged high capacity auto-transfusion to remove some of these emboli from the blood of normal subjects.

THE DRAWING SHOWS THE PREFERRED EMBODIMENT OF THE INVENTION

One mechanism utilizing my invention consists of a base 23 which supports a rigid framework 29 with braces 13. This framework in turn supports the filter holder 11 with its drainage passageways 12. The filter holder 11 supports the large high capacity minimal pore filter 4 as indicated by the dashed line. Above this filter the collapsible bag of blood 1 is inverted and suspended 26 and by means of a rigid passageway 3 the blood is allowed to drain by hydrostatic pressure into a space 30 above the filter which is separated from the interior of the closed framework 29 by a flexible pleated solid sheath 6 which is sealed to the exterior of the rigid passageway 3 and also sealed to the peripheral edge of the filter 4 by its sealing gasket 7. There are open passageways 8 which provided a common space above this flexible pleated solid sheath 6 and about the collapsible bag of blood 1 and about the rigid passageway 3 which permit a compressing medium to compress the contents within this bag 1 and of the space 30 so as to force the blood through the pores of the filter 4. An inlet valve 9, a pressure relief valve 10, and a throttle valve 28 are provided to control and to relieve this pressure as necessary. By such a construction the blood is separated from the compressing medium by means of flexible sheath or sack wall and by the wall of the passageway.

Beneath the filter support 11 a closed funnel-shaped space 18 is provided for gravity drainage of the filtered blood into its receiving bottle. This space 18 is provided with a vacuum 16 with a check valve and a passageway which opens into the space 18 at an opening 15 and into the top of a rigid passageway 14 into the top of the receiving bottle of blood. This vacuum also passes through the filter pores providing for the preliminary evacuation of the air from the space 30 between the filter and its covering flexible pleated solid sheath thereby preventing the mixture of air with blood as the blood passes through the filter pores. The opening 14 into the receiving bag serves to remove any frothed blood in the bottle. The trap 17 is provided for any such froth which might be collected by aspiration. Despite an even pressure upon the inverted unfiltered bag of blood and the sheath 6 the blood empties from the bag into the space 30 by means of the hydrostatic pressure of gravity.

The base 23 is provided with a top whose periphery is provided with a spline 25 which matches a similar spline on the periphery of the bottom of the framework 29, this spline supplying friction to prevent the rotation of the framework 29 upon the base 23. The base is provided with a shaft 24 which is turned slowly by a reduction geared motor, the end of the shaft being a ball 21 into a receiving socket of the framework 29, forming a ball and socket union between the base and the framework and upon which the weight of the framework 29 rests. An arm 22 of the shaft 24 is slightly tilted upward and is provided at its end by a wheel 27 which rotates about the bottom of the framework 29, thereby causing a rotary elevation of the framework 29 upon the ball and socket 21, the framework 29 being unable to itself rotate horizontally about this ball and socket because of the splines 25. Such a slow rotary elevation of the periphery of the framework 29 produces a rotating slow swirling wave of blood within the space 30 above the filter and beneath its covering flexible pleated solid sheath 6, thereby causing an even distribution of the blood over the large filter.

In the procedure of filtering the blood the vacuum is first applied beneath the flexible pleated solid sheath 6 through the filter thereby removing the air and making the space 30 a closed space. The bag of blood is then inverted and the perforating passageway 3 is inserted, the closed space 8 is closed and compressed air or other compression medium is applied about this bag, its connection, and the flexible pleated solid sheath to force the blood through the filter—assisted by the vacuum beneath the filter. Simultaneously with the insertion of the perforating passageway 3 into the bag of blood the rotary elevation of the periphery of the framework 29 is started.

What I claim that is new and useful in my invention is:

1. A blood filter system comprising:
 a rigid frame structure;
 a filter support attached within said frame structure having openings therein to permit passage of blood therethrough, said filter support dividing said frame structure into an upper chamber and a lower chamber;
 a filter positioned adjacent said filter support within said upper chamber;

a flexible solid sheath having its edges attached to said filter to form a collapsible blood receiving container;

seal means for sealing said solid sheath to said filter support to create a fluid-tight seal around the container formed by said sheath and said filter;

means for generating pressure in the upper chamber of said frame structure and against said solid sheath to force blood deposited within the container formed by said sheath and said filter through said filter; means to produce a rotating slow swirling wave of blood upon said filter mesh within said upper chamber, and;

collection means positioned below said filter support in the lower chamber of the frame structure to collect said blood filtered through said filter.

2. The blood filter system of claim 1 further comprising:

suction means for applying a suction in the lower chamber of said frame structure to remove air from the container formed by said sheath and said filter prior to the introduction of blood into the container.

3. The blood filter system of claim 1 further comprising:

a collapsible blood supply container suspended in the upper chamber; and a rigid tube communication between said blood supply container and said container formed by said sheath and said filter for channelling blood from said blood supply container over said filter.

4. The blood filter system according to claim 1 wherein said filter is characterized by a mesh having 14 to 20 micron pores therein.

5. A method for filtering blood comprising:

depositing blood in a bag-like container having one surface composed for a filter mesh with the remainder of the container composed of a flexible solid sheath material;

sealing the sheath material to a filter support such that the filter is adjacent the support;

introducing blood into the container formed by the sheath material and the filter;

applying a pressure to the container opposite the filter support to force blood through the filter, and;

rocking said bag-like container thereby to produce a rotating slow swirling wave of blood upon said filter mesh.

6. The method according to claim 5 further comprising:

applying a suction in an area relative to the filter support opposite the filter prior to the introduction of blood into the container formed by the sheath material and the filter to evacuate air from the container to prevent frothing; and collecting the blood filtered through the filter.

* * * * *